(No Model.)
J. W. ANGUS.
HAY AND GRAIN CAP.
No. 252,168. Patented Jan. 10, 1882.
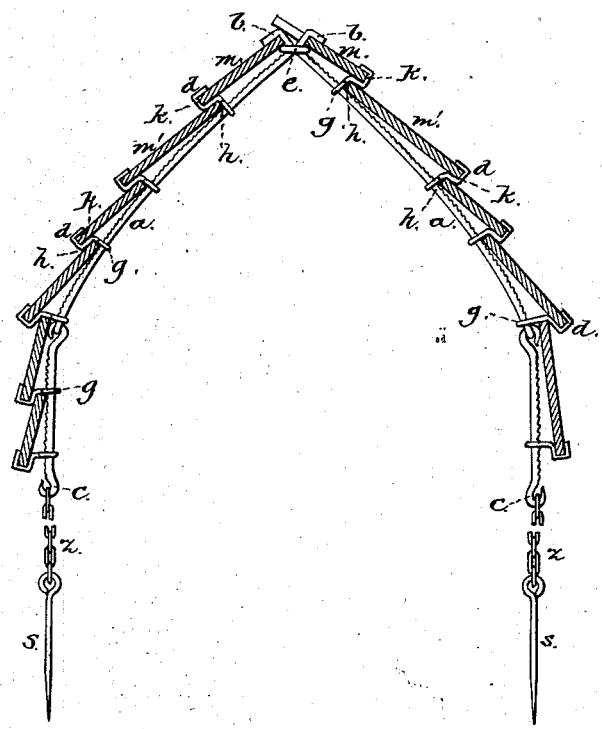
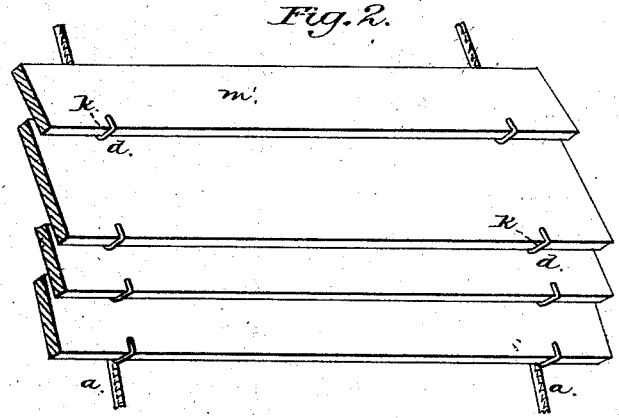
WITNESSES
John A. Ellis
Philip C. Max
INVENTOR
J. W. Angus
by Anderson Smith
his ATTORNEYS

UNITED STATES PATENT OFFICE.

JAMES W. ANGUS, OF MACON, MISSOURI, ASSIGNOR OF ONE HALF TO JOHN SHEPHERD, OF SAME PLACE.

HAY AND GRAIN CAP.

SPECIFICATION forming part of Letters Patent No. 252,168, dated January 10, 1882.

Application filed November 26, 1881. (No model.)

*To all whom it may concern:*

Be it known that I, JAMES W. ANGUS, a citizen of the United States, resident of Macon, in the county of Macon and State of Missouri, have invented a new and valuable Improvement in Coverings for Hay or Grain Stacks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical section, and Fig. 2 is a perspective of a portion thereof.

This invention has relation to coverings or caps for stacks of hay or grain; and it consists in the construction and novel arrangement of the side rods or wires and the hooks connected therewith and adapted to hold the covering-boards, all as hereinafter set forth.

In the accompanying drawings, the letters $a\ a$ designate rods or stout wires, which are designed to extend from the top of the stack downward on each side thereof. Each rod is provided at its upper end with a hook or catch, $b$, and should have at its lower end a stud or catch, $c$, to prevent the hooks $d$ from falling off when the rods are carried about or are being adjusted upon the stack. These rods are arranged in pairs, and are connected at their upper ends by means of a pivot or link, the latter being preferable, and indicated at $e$ in the drawings.

It is generally advisable to roughen or notch the wires, as shown in the drawings, in order to afford a secure bearing for the eyes $g$ of the hooks $d$. These hooks are similar in formation, consisting each of an eye, $g$, a stem extending at first outward and then downward, forming an under catch, $h$, and then extending outward and upward, forming the upward catch, $k$, or hook proper. These hooks are not rigidly fastened to the side rods, but have their eyes a little loose thereon, so that they can be easily adjusted up or down on the rods. The upper hooks or catches, $b$, of the rods are turned downward, and when the rods are in position across the stack said hooks are located at the top of the same, and the upper boards, $m$, are placed with their upper edges under said hooks, and are supported by bringing up the first adjustable hooks on the rods which engage the lower edges of the first boards. The next boards, $m'$, are placed with their upper edges in the under bends or catches, $h$, of these adjustable hooks, and are supported by bringing the next hooks on the rods into engagement with their lower edges. The succeeding boards may be attached by means of the remaining hooks, in succession, to the rods in a similar manner, until a sufficient covering is provided for the stack. The hooks, after adjustment on the rods, in connection with the boards, are pressed downward obliquely by the weight on their outer ends, and have therefore a firm purchase or bite on the rods, so that they will hold their places securely.

Boards of different widths may be employed in connection with these adjustable hooks, no uniformity being required in this particular, and as their upper edges are covered by the under edges of the boards next in succession above, the lapped construction affords a good water-shed.

In order to prevent leaking at the top or ridge, one of the top boards may be notched in its upper edge, so that it can extend above its fellow on the opposite side; or the rods of one side of the stack may be pushed up a little farther than the rods on the other side, in such a manner that when the upper boards are adjusted in place one will extend higher than the other and over its upper edge. No measurement is required in attaching the boards, as the proper manner is to begin at the top and push the hooks up as the boards are added.

In some cases anchoring-stakes $s$ may be connected by chains $z$ to the lower ends of the rods, thereby securing the covering to the ground and preventing it from being blown off by a high wind.

Having described this invention, what I claim, and desire to secure by Letters Patent, is—

1. In a stack-covering, the side rods or wires, $a$, having the top connection, $e$, and the adjustable hooks $d$, having the under bends or catches, $h$, and the eyes $g$, arranged on said rods or wires, substantially as specified.

2. The stack-covering consisting of the hook rods or wires $a$, connected in pairs at their upper ends, the adjustable hooks $d$, having the under bends or catches, $h$, and the lapped boards, held in place by said hook-rods and the adjustable hooks, substantially as specified.

In testimony that I claim the above I have hereunto subscribed my name in the presence of two witnesses.

JAMES W. ANGUS.

Witnesses:
 D. E. WILSON,
 A. H. PAYSON.